(12) United States Patent
Vlutters et al.

(10) Patent No.: US 7,885,152 B2
(45) Date of Patent: Feb. 8, 2011

(54) SINGLE SPOT CROSS-CORRELATION TRACKING

(75) Inventors: Ruud Vlutters, Eindhoven (NL); Bin Yin, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 506 days.

(21) Appl. No.: 11/993,896

(22) PCT Filed: Jun. 27, 2006

(86) PCT No.: PCT/IB2006/052130

§ 371 (c)(1),
(2), (4) Date: Dec. 26, 2007

(87) PCT Pub. No.: WO2007/000736

PCT Pub. Date: Jan. 4, 2007

(65) Prior Publication Data

US 2009/0028022 A1    Jan. 29, 2009

Related U.S. Application Data

(60) Provisional application No. 60/695,066, filed on Jun. 29, 2005.

(51) Int. Cl.
*G11B 7/00* (2006.01)
(52) U.S. Cl. .................................. 369/44.41
(58) Field of Classification Search ............... 369/44.41
See application file for complete search history.

(56) References Cited

U.S. PATENT DOCUMENTS

| | | | |
|---|---|---|---|
| 4,982,393 A | | 1/1991 | Matsushita et al. |
| 5,282,192 A | * | 1/1994 | Yamada et al. ........... 369/275.4 |
| 5,434,834 A | | 7/1995 | Shinoda et al. |
| 5,764,605 A | * | 6/1998 | Zucker et al. ............ 369/44.29 |
| 5,905,703 A | * | 5/1999 | Osada ...................... 369/44.41 |
| 6,317,394 B2 | * | 11/2001 | Ohshita et al. ........... 369/44.28 |
| 6,452,878 B1 | | 9/2002 | Graffouliere |
| 6,480,445 B1 | * | 11/2002 | Yun et al. ................. 369/44.32 |
| 6,813,228 B2 | | 11/2004 | Kadlee et al. |
| 7,164,628 B2 | * | 1/2007 | Mikami .................... 369/44.28 |
| 7,385,888 B2 | * | 6/2008 | Stallinga et al. .......... 369/44.41 |

FOREIGN PATENT DOCUMENTS

| WO | WO2004019332 A1 | 3/2004 |
|---|---|---|
| WO | WO2004105002 A1 | 12/2004 |
| WO | WO2004112013 A1 | 12/2004 |

* cited by examiner

*Primary Examiner*—Wayne R Young
*Assistant Examiner*—Latanya Bibbins

(57) ABSTRACT

A tracking error (TE) signal is formed from a single spot on a photodetector 25 to improve the robustness in optical disc applications having a reduced track-pitch. Reduced track pitches are employed in high data capacity optical disc formats. By using high frequency cross-correlation of a central aperture signal, the differences within the left 21 and right 23 detector halves yield a divergence from the zero crossing that produces a more pronounced tracking signal. The more pronounced tracking signal is insensitive to incoherent cross talk in multi-layer discs.

14 Claims, 3 Drawing Sheets

FIG. 1 – PRIOR ART –

SINGLE SPOT CROSS-CORRELATION TRACKING

CROSS REFERENCE TO RELATED APPLICATION

This application claims the benefit of U.S. provisional application Ser. No. 60/695,066 filed Jun. 29, 2005, which is incorporated herein by reference.

The present invention relates to tracking on optical discs, and more particularly to generating robust tracking error signals for optical discs that have very small track pitches.

Optical disc technology is an evolving art that continues to increase the storage capacity of optical disc media. An example of one of the newer standards that illustrate the increasing density of optical media is the Blu-ray Disc (BD) format. The BD format employs a radiation beam having a shorter wavelength with a larger numerical aperture (NA) to facilitate a reduction in track pitch and channel length resulting in an increase in the storage capacity of the optical disc media. By using a shorter wavelength, shorter bit lengths (tangential density) and reduced track pitches (radial density) can be employed due to the smallness of the light spot that can be used in reading and writing operations compared to previously existing CD and DVD formats. The smaller focused laser spot of the shorter wavelength radiation beam enables optical disc media conforming to the BD format that places tracks closer together at a track-pitch of 320 nm (as compared to 1.6 μm for CD and 740 nm for DVD).

Reducing the track pitch even further on the optical media can lead to even higher capacity. There is a problem in employing track pitches that are less than 320 nm in that more cross talk can result from the data being close together. Eliminating cross talk has been a major focus in more recent optical disc media formats. Employing track pitches to below 320 nm greatly reduces the tracking error signal resulting in substantial deterioration in tracking performance. The reduction in the tracking error signal results in tracking degradation to the point that the optical beam often drifts off-track.

A single-spot Differential Phase Detection (DPD) signal relies on both tangential diffraction and radial diffraction. Tangential diffraction is diffraction from the data marks within the tracks, specifically, the I2-I8 marks contained on discs within Blu-ray format. Tangential diffraction is typically only available when there is written data on the disc. Radial diffraction is diffraction that results from the grating structure of the tracks. The grating structure of the tracks is a very periodic structure, in which the track-pitch determines the diffraction angles. Both diffraction types should interfere with the 0-th order reflection (no diffraction) in order to obtain a reliable DPD signal. Therefore this method has problems at reduced track-pitches. Using push-pull tracking, based solely on radial diffraction is even worse.

Differential Phase Detection (DPD) is commonly used within the prior art for detecting light that has reflected from an optical disc. Differential Phase Detection has been used within the prior art for generating a tracking error (TE) signal. Using DPD, the TE is generated by differences within the phases of received signals in diagonally opposite light receiving portions of the four-divided light detectors. The signals received by the four light detectors are input into amplification circuits and arranged such that tangential diffraction can be determined from a difference between the upper two and lower two detector quadrants, and radial diffraction can be determined by a difference between the two left and two right detector quadrants. While effective with larger track pitches, the DPD method has problems at reduced track-pitches. Using push-pull tracking techniques that are solely based upon radial diffraction is even worse.

From the foregoing discussion, it should be readily apparent that there remains a need within the art for a method and apparatus that preserve the tracking error signal for optical discs having small track pitches.

As optical disc media continues to evolve, the capacity optical discs are increased with the introduction of new standards. A common technique in increasing optical disc capacity is to employ a laser having a shorter wavelength. One modern standard for high-density optical discs is the Blu-Ray disc (BD) standard. To increase that data capacity for a BD beyond 27 GB either an increase in the tangential density must be achieved by reducing the channel bit length or an increase in the radial density must be achieved by reducing the track-pitch.

Recently developed optical disc standards commonly employ a similar technique for achieving greater information density by reducing the track-pitch. Reduced track pitches are typically implemented by employing radiation sources that emit light having shorter wavelengths than the wavelengths commonly used for CDs and DVDs. A problem that exists in implementing these newer optical disc standards is that by reducing the track pitch results in a reduction of the tracking-error signal. The small tracking-error signal that results from using conventional techniques in obtaining the tracking error signal makes it extremely difficult to keep the laser spot on track. The reduction in the tracking-error is due to a cut-off in the modulation transfer function (MTF) of the optical spot.

FIG. 1 illustrates the push-pull tracking error signals that result using a standard track-pitch of 320 nm, a reduced track-pitch of 250 nm and further at a reduced track pitch of 200 nm. The push-pull tracking error ($TE^{PP}$) signals shown in FIG. 1 are calculated in the manner represented by Equation 1.

$$TE^{PP} = (A^{LPF} - B^{LPF})/(A^{LPF} + B^{LPF}) \qquad \text{Equation 1}$$

In Equation 1, LPF indicates a low-pass filtered version of a signal is being used. As used herein, an LPF signal will have a cut-off of around 30 KHz. In Equation 1, A represents the signal generated by the left side (with respect to a track) of a light detector that detects reflected light from the optical media and B represents the signal generated from the right side of the light detector. The LPF version of the right photo-detector signal ($B^{LPF}$) is subtracted from the LPF version for the left detector signal ($A^{LPF}$). The difference in the LPF signals ($A^{LPF} - B^{LPF}$), is normalized by dividing that difference by the sum of the LPF signals ($A^{LPF} + B^{LPF}$) to account for fluctuations in the read-power and disc reflectivity.

As shown in FIG. 1, the tracking error signal that results from using Equation 1 is satisfactory for optical media having a track pitch on the order of 320 nm. As the track pitch becomes smaller, the reduction in the tracking error signal is dramatic and becomes unusable.

In view of the foregoing discussion, there remains a need within the art for a technique that can be employed to obtain a tracking error signal that will not rapidly decrease in amplitude as the track-pitch is reduced.

The embodiments disclosed herein address the above discussed problems within the prior art and can be successfully employed on various types of discs having reduced track pitches. The reduced track pitch discs include but are not limited to ROM discs as well as already written R and RE discs (here R stands for recordable and RE stands for recordable/erasable discs).

The embodiments described herein employ a novel and inventive manner for calculating the tracking-error signal which results in a signal that provides much more robust tracking on narrow track-pitches, thereby enabling much higher radial densities.

Another advantage of the embodiment described herein is that the resulting tracking error signal is highly insensitivity to incoherent cross talk when applied to multi-layer discs.

The embodiments described herein address the above described shortcomings within the prior art by providing tracking techniques that scales more effectively at short track-pitches compared to DPD and Push-Pull tracking methods. The BD format has been already standardized such that there are currently three capacities, namely, 23.3 GB, 25 GB and 27 GB. In all three of aforementioned BD capacities, the track pitch is set to 320 nm. The embodiments described herein address the needs that exist within these current capacities as well addressing the aforementioned problems to further reducing track pitches to further increase the storage capacity.

An embodiment as described herein provides a more robust tracking signal based on a single spot.

A further embodiment provides robustness in tracking signals that are obtained from reduced track-pitch optical discs found on high data capacity discs.

A still further embodiment provides a tracking signal that is insensitive to incoherent cross talk in multi-layer discs.

The above embodiments are achieved by obtaining a difference in high frequency cross-correlation components. The difference in high frequency cross-correlation components is obtained between radial distances of a detector that senses a radiation beam reflected from the optical disc having a reduced track pitch.

Figure 2:
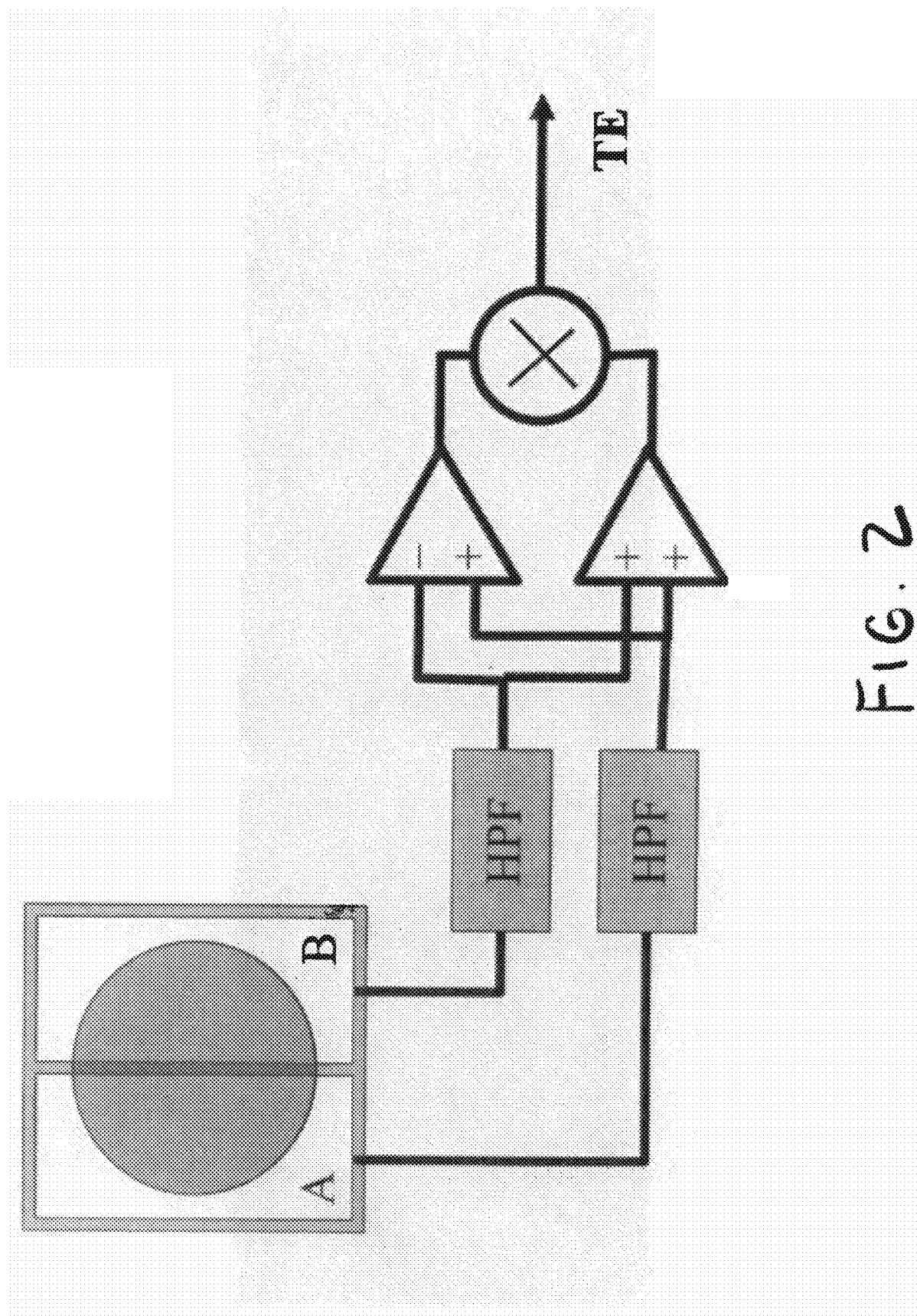
FIG. 2 is a schematic block diagram for a configuration that generates a tracking error signal using high pass filtered signals.

An embodiment as illustrated in FIG. 2 envisions using the high frequency (HF) components to generate the tracking error signal. A detection device such as photodetector 25 is arranged into halves 21, 23, generally referred to as components A, B. It will be readily understood by those skilled in the art that a Differential Phase Detection (DPD) as previously discussed can be arranged into radial halves with the respective halves being on opposite sides of the tracking groove. Each radial half 21, 23 of photodetector 23 generates an electrical signal that is indicative of the amount of radiation that has been reflected from an optical disc media (not shown). The signals generated by radial halves 21, 23 of photodetector 25 have their low frequencies attenuated by high pass filters 27, 29. By using the full amount of the high frequencies from the left half 21 (A) and right half 23 (B) of the photo-detector, it is possible to make a much more robust tracking error signal compared to tracking error signals that are generated using the low frequency (low pass filtered) versions of these signals of the prior art as previously discussed.

As shown in FIG. 2, cross-correlation is accomplished between the high frequency components. As shown in FIG. 2, by differencing amplifier 31 will receive inputs from the high passed filters 27, 29 contained the high frequency signals from the left and right radial halves 21, 23 received by the detector to form a differenced value (A−B). The differenced value (A−B) is cross-correlated with the entire amount of the high frequency components of central aperture (A+B) signal by multiplying these values by multiplier 35. The cross correlated tracking error ($TE^{Xcorr}$) signal obtained in this manner is not susceptible to reductions in the track pitch. The resulting relationship discussed above is shown in Equation 2.

$$TE^{Xcorr}=(A^{HPF}-B^{HPF})*(A^{HPF}+B^{HPF}) \quad \text{Equation 2}$$

In Equation 1, HPF indicates a high-pass filtered version of a signal is being used. As in Equation 1, A represents the signal generated by the left side (with respect to a track) of a light detector that detects reflected light from the optical media and B represents the signal generated from the right side of the light detector. The HPF version of the right photo-detector signal ($B^{HPF}$) is subtracted from the HPF version for the left detector signal ($A^{HPF}$). The difference in the HPF signals ($A^{HPF}-B^{HPF}$), is multiplied by the sum of the HPF signals ($A^{HPF}+B^{HPF}$) to create more discernible gyrations in the resulting cross correlated tracking error ($TE^{Xcorr}$) signal obtained in this manner.

In another embodiment, the cross correlation is performed using high frequency components combined differently from the combination that is illustrated in FIG. 2. For example, the differenced value can be multiplied by a constant value.

In another embodiment, the high-pass filtering is done after the summation and subtractions are performed, but before performing the multiplication.

Another embodiment envisions performing the correlation with high-pass filtered (AC) signals, thus providing a TE signal that is insensitive to DC-offsets.

Another embodiment envisions that the TE signal can be first low-pass filtered or directly fed to the Optical Pick-up Unit (OPU).

In an embodiment for a method, reliance is made on there being no tracking-offset. Therefore, the amount of information related to the data patterns on the disc (measured by A+B) is uniformly distributed over the two detector halves. If the optical spot is a bit off-track, this information will be distributed non-evenly over the 2 detector halves and the cross-correlation will become a measure of the tracking-error. Then the method will realize tracking by balancing the amount of information over the 2 detector halves.

Figure 1:
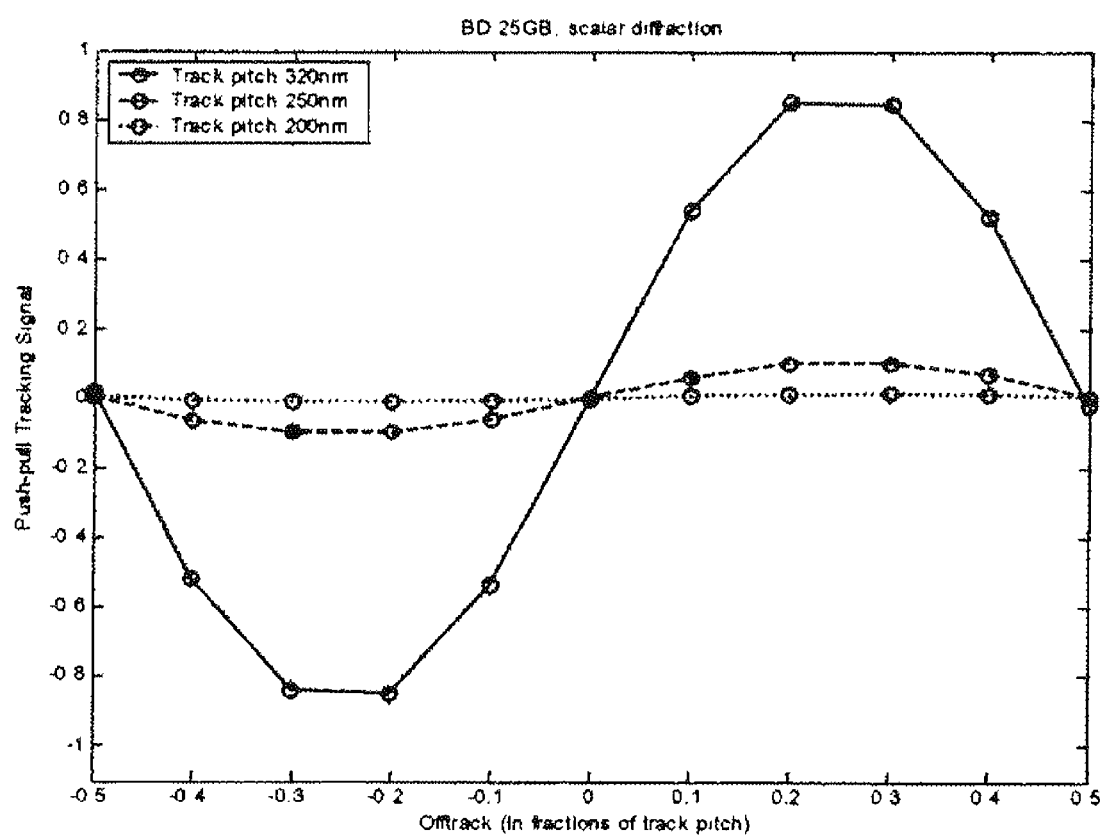
FIG. 1 is an illustration of tracking error signals for different size track pitches using low pass filter signals.
Figure 3:
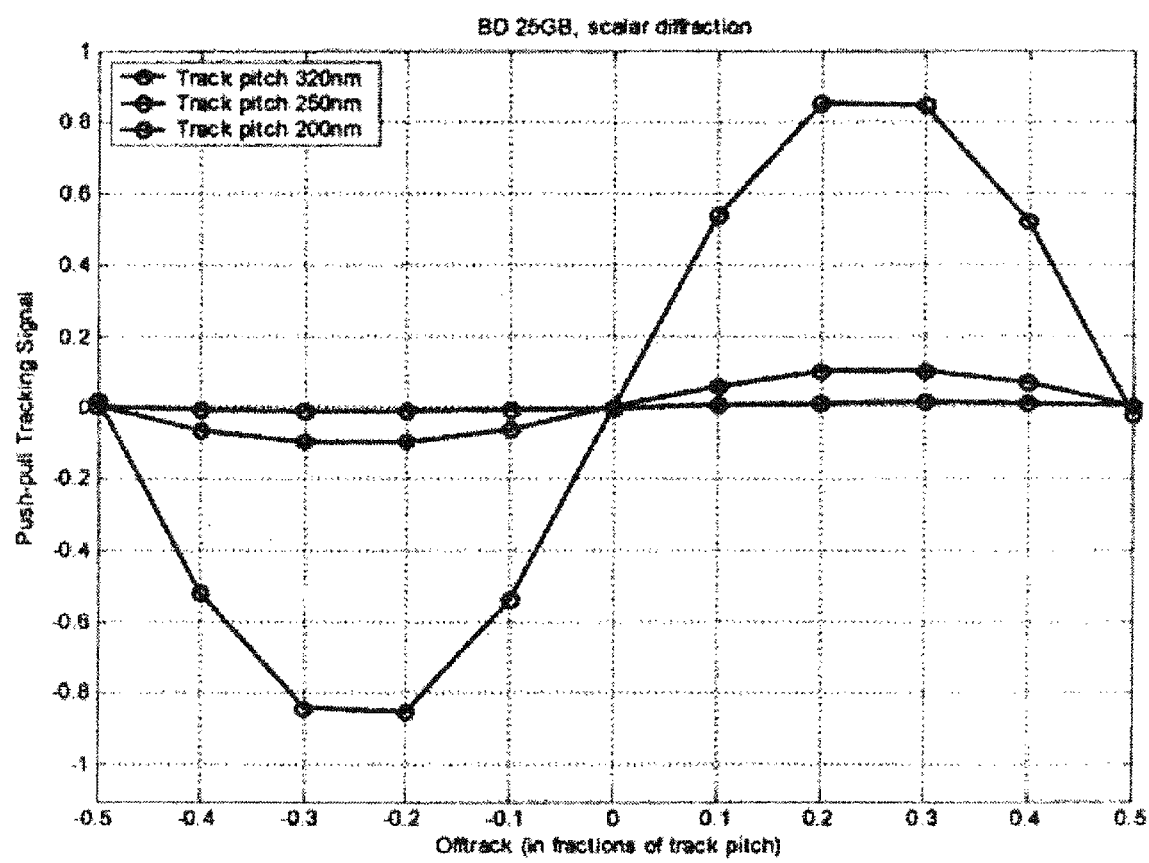
FIG. 3 is an illustration of tracking error signals for different size track pitches using high pass filtered signals.

FIG. 3 illustrates the TE-signal that is obtained using an apparatus like that shown in FIG. 2 to perform the relationship of Equation 2. As shown in FIG. 3, the TE signal obtained shows clearly discernible zero crossings. It should be noted that FIG. 3 illustrates TE signals that are obtained for the same 3 track-pitches that are shown in FIG. 1. As can be seen in FIG. 3, even at a track-pitch of 200 nm, there is still a reasonable amount of tracking error signal left, making it possible to track discs with very narrow track-pitches.

Another embodiment provides a tracking error signal for multi-layer discs. This embodiment, as discussed below, is insensitive to incoherent cross talk. It is envisioned that the techniques described herein are also insensitive for coherent cross talk. Within this embodiment, if a radiation beam is focused on the bottom layer (L0) of a double-layer disc, the reflected light detected by the photo-detectors will mostly be related to the content of the bottom layer (L0). However, there will also be a small signal related to the out-of-focus upper layer (L1). This small signal from the upper layer (L1) can disturb the overall tracking, therefore, the better the small signal from the upper layer (L1) can be suppressed, the more robust the tracking will be. Thus, in the case in which there are two layers L0 and L1, the intensities on the A and B photo-detectors can be written as: $A_{TOT}=A_{L0}+A_{L1}$; $B_{TOT}=B_{L0}+B_{L1}$. Here, the subscripts denote the layer from which modulation in the signal is coming from. The cross-correlation tracking error is then represented by the relationship shown in Equation 3.

$$TE^{Xcorr} = (A_{L0}^{HPF} + A_{L1}^{HPF} - B_{L0}^{HPF} - B_{L1}^{HPF}) *$$ Equation 3
$$(A_{L0}^{HPF} + A_{L1}^{HPF} + B_{L0}^{HPF} + B_{L1}^{HPF})$$
$$= (A_{L0}^{HPF} - B_{L0}^{HPF}) * (A_{L0}^{HPF} + B_{L0}^{HPF}) +$$
$$(A_{L1}^{HPF} - B_{L1}^{HPF}) * (A_{L1}^{HPF} + B_{L1}^{HPF})$$
$$= (A_{L0}^{HPF} - B_{L0}^{HPF}) * (A_{L0}^{HPF} + B_{L0}^{HPF})$$

The relationship expressed by Equation 3 has advantages. First of all, the DC-component of the cross talk from the out-of-focus layer is thrown out because the signals have been high-pass filtered. Furthermore, the correlation between data from different layers is non-existent because they are statistically un-correlated. Next, the optical spot is completely blurred on the out-of-focus (L1) layer, so moving this spot will not generate a signal that is related to a track-offset. Furthermore, the amplitude of the second term (related to L1) will be a factor $\alpha(<<1)$ smaller than from layer L0, and the influence on the tracking-error signal will be $\alpha^2$, so even smaller. In other words, we can neglect the term related to layer L1.

The above-described embodiments can be employed on any type of optical media that employs tracks. These embodiments are especially useful in optical discs that have narrow track pitches. Among these are the new generation of ROM discs of a new generation of optical storage (BD+ or Near Field), where both tangential and radial densities will be pushed beyond the resolution of the optical spot.

The embodiments of the invention are for use in the newer generation of optical storage discs such as Blu-ray disc or extended formats and near field discs, where both tangential and radial densities will be pushed close to or beyond the resolution of the optical spot. It will be readily apparent to those skilled in the art that implementations other than these preferred embodiments are possible. Therefore, the scope of the invention should be measured by the appended claims.

The invention claimed is:

1. A method for generating a tracking error (TE) signal comprising:
   generating a light spot on an optical media;
   measuring light reflected from the optical media in a detector (25) that is arranged into a plurality of components (21, 23) that are spaced in a radial direction to generate a plurality of signals representative of the reflected light reflected from the optical media, wherein the radial direction is measured from a center of the disc to an outside edge of the disc;
   high pass filtering (27, 29) the signals to form a plurality of high frequency components of the signals;
   correlating the high frequency components in the radial direction to obtain the tracking error signal by forming a differenced value of the high frequency components and multiplying the differenced value by a summation representative of a total value of the high frequency components.

2. The method of claim 1, wherein high-pass filtering is done alter forming the summation and differenced value but before performing multiplying.

3. The method of claim 1, wherein the step of high pass filtering is performed after forming the differenced value.

4. The method of claim 1 wherein tile step of high pass filtering is perforated before forming the differenced value.

5. The method of claim 1 wherein the plurality of components is arranged as a pair of halves spaced in the radial direction and the step of correlating further comprises the tracking error signal being zero if the reflected light is uniformly distributed over the halves.

6. The method of claim 1 further comprising the step of tracking by moving the light spot in response to the step of correlating in a direction that reduces the tracking error signal.

7. The method of claim 1 further comprising the step of low-pass filtering the tracking error signal or directly feeding the tracking error signal into an Optical Pick-up Unit.

8. A system that generates a tracking error signal comprising:
   an optical system the generates a light spot on an optical media by measuring light reflected from the optical media in a detector (25) that is arranged into a plurality of components (21, 23) that are spaced in a radial direction to generate a plurality of signals representative of the reflected light reflected from the optical media, wherein the radial direction is measured from a center of the disc to an outside edge of the disc;
   at least one high pass filter (27, 29) operatively connected to the signals that forms a plurality of high frequency components of the signals; and
   a correlation mechanism that correlates the high frequency components in the radial direction to obtain the tracking error signal wherein the correlation mechanism forms a differenced value of the high frequency components and multiplying the differenced value by a summation representative of a total value of the high frequency components.

9. The system of claim 8, wherein the correlation mechanism forms the summation and differenced value after the high-pass filter forms the plurality of high frequency components but before the correlation mechanism multiplies the differenced value by the summation.

10. The system of claim 8 wherein the high-pass filter forms the plurality of high frequency components before forming file differenced value.

11. The system of claim 8, wherein the high-pass filter forms the plurality of high frequency components after forming the differenced value.

12. The system of claim 8 wherein the plurality of components is arranged as a pair of halves spaced in the radial direction and the correlation mechanism generates the tracking error signal being zero if the reflected light is uniformly distributed over the halves.

13. The system of claim 8 further comprising a tracking mechanism that tracks on the optical media by moving the light spot in a direction that reduces the tracking error signal.

14. The system of claim 8 further comprising a low-pass filter of the tracking error signal or operatively connecting the tracking error signal into an Optical Pick-up Unit.

* * * * *